(12) United States Patent
Felkl et al.

(10) Patent No.: US 10,641,090 B2
(45) Date of Patent: May 5, 2020

(54) METHOD FOR EVALUATING AND MONITORING FORMATION FRACTURE TREATMENT USING FLUID PRESSURE WAVES

(71) Applicant: Seismos Inc., Austin, TX (US)

(72) Inventors: Jakub Felkl, Austin, TX (US); Youli Quan, Houston, TX (US); Junwei Zhang, Austin, TX (US); Kaitlyn Christine Mascher-Mace, Aurora, CO (US); Panagiotis Adamopoulos, Lakeway, TX (US)

(73) Assignee: Seismos Inc., Austin, TX (US)

( * ) Notice: Subject to any disclaimer, the term of this patent is extended or adjusted under 35 U.S.C. 154(b) by 0 days.

(21) Appl. No.: 15/810,817

(22) Filed: Nov. 13, 2017

(65) Prior Publication Data
US 2018/0320514 A1    Nov. 8, 2018

Related U.S. Application Data

(63) Continuation of application No. PCT/US2017/031507, filed on May 8, 2017.

(51) Int. Cl.
*E21B 49/00* (2006.01)
*E21B 43/26* (2006.01)
(Continued)

(52) U.S. Cl.
CPC ............ *E21B 49/008* (2013.01); *E21B 43/26* (2013.01); *E21B 43/267* (2013.01); *E21B 47/06* (2013.01); *G01V 1/40* (2013.01); *G01V 1/48* (2013.01); *G01V 1/50* (2013.01); *G01V 2210/123* (2013.01); *G01V 2210/1234* (2013.01); *G01V 2210/646* (2013.01)

(58) Field of Classification Search
CPC ...... E21B 43/26; E21B 43/267; E21B 49/006; E21B 49/008
See application file for complete search history.

(56) References Cited

U.S. PATENT DOCUMENTS

| 3,406,776 A | 10/1968 | Henry |
| 4,832,121 A * | 5/1989 | Anderson ............... E21B 43/26 166/250.09 |

(Continued)

FOREIGN PATENT DOCUMENTS

WO    1998/034105 A1    8/1998

OTHER PUBLICATIONS

International Search Report and Written Opinion, International Application No. PCT/US2017/031507 dated Aug. 11, 2017.

(Continued)

*Primary Examiner* — Jennifer H Gay
(74) *Attorney, Agent, or Firm* — Richard A. Fagin

(57) ABSTRACT

A method for characterizing a hydraulic fracture in a subsurface formation includes inducing a pressure change in a well drilled through the subsurface formation. At least one of pressure and pressure time derivative are measured in or at a location proximate to a wellhead for a selected length of time. At least one of a physical parameter, a time derivative, and a change in the parameter with respect to time of the physical parameter of at least one fracture is determined using the measured at least one of pressure and the time derivative of pressure.

19 Claims, 8 Drawing Sheets

(51) Int. Cl.
*G01V 1/40* (2006.01)
*G01V 1/48* (2006.01)
*G01V 1/50* (2006.01)
*E21B 43/267* (2006.01)
*E21B 47/06* (2012.01)

(56) References Cited

U.S. PATENT DOCUMENTS

| | | | |
|---|---|---|---|
| 4,858,130 A * | 8/1989 | Widrow | E21B 43/26 |
| | | | 702/11 |
| 7,819,188 B2 | 10/2010 | Auzerais et al. | |
| 2002/0188407 A1* | 12/2002 | Khan | G01V 1/40 |
| | | | 702/16 |
| 2008/0164021 A1 | 7/2008 | Dykstra | |
| 2010/0157737 A1 | 6/2010 | Miller et al. | |
| 2011/0030467 A1* | 2/2011 | Bakulin | E21B 47/101 |
| | | | 73/152.32 |
| 2011/0120718 A1 | 5/2011 | Craig | |
| 2011/0218737 A1 | 9/2011 | Gulati | |
| 2013/0079935 A1* | 3/2013 | Kabannik | E21B 43/26 |
| | | | 700/282 |
| 2014/0017092 A1 | 1/2014 | Brackel | |
| 2014/0262232 A1 | 9/2014 | Dusterhoft et al. | |
| 2014/0299315 A1 | 10/2014 | Chuprakov et al. | |
| 2014/0334262 A1 | 11/2014 | Brune | |
| 2015/0039234 A1 | 2/2015 | Abou-Sayed et al. | |
| 2015/0075778 A1 | 3/2015 | Walters et al. | |
| 2015/0134620 A1 | 5/2015 | Crafton | |
| 2015/0354337 A1* | 12/2015 | Ersoz | E21B 47/00 |
| | | | 166/250.1 |
| 2015/0355374 A1 | 12/2015 | Morton et al. | |
| 2016/0010443 A1 | 1/2016 | Xu | |
| 2016/0139588 A1 | 5/2016 | Huang | |
| 2016/0230547 A1* | 8/2016 | Lamei | E21B 49/008 |
| 2016/0333684 A1* | 11/2016 | James | E21B 49/008 |
| 2017/0138182 A1* | 5/2017 | Bogdan | E21B 17/20 |
| 2018/0094521 A1* | 4/2018 | Adamopoulos | E21B 43/26 |
| 2018/0320514 A1* | 11/2018 | Felkl | E21B 47/06 |
| 2019/0055836 A1* | 2/2019 | Felkl | E21B 47/06 |
| 2019/0146115 A1* | 5/2019 | Mayo | G01V 1/42 |

OTHER PUBLICATIONS

Canadian Office Action dated Jan. 31, 2020, for Canadian Patent Application No. 3,034,352.

Canadian Office Action dated Jan. 31, 2020, for Canadian Patent Application No. 3,034,219.

* cited by examiner

METHOD FOR EVALUATING AND MONITORING FORMATION FRACTURE TREATMENT USING FLUID PRESSURE WAVES

CROSS REFERENCE TO RELATED APPLICATIONS

Continuation of International (PCT) Application No. PCT/US2017/031507 filed on May 8, 2017. Priority is claimed from U.S. Provisional Application No. 62/376,465 filed on Aug. 18, 2016.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of borehole acoustic analysis and hydraulic fractures as well as hydraulic fracturing process monitoring and evaluation. In particular, the monitoring can be in real time while hydraulic stimulation takes place, while additional analysis of the data or comparisons with prior models can also be performed at another time.

This disclosure also relates to the field of seismic analysis of hydraulic fractures. More specifically, the disclosure relates to method for analyzing geophysical properties of hydraulic fracture by analysis of pressure wave reflection and resonance.

Furthermore, this disclosure also relates to measurements of fracture (network) connectivity to wellbore and fracture (network) connectivity to the external reservoir volume.

Hydraulic fracturing has recently accounted for a significant growth of unconventional (tight, shale) reservoir production in the United States. During hydraulic fracturing, fluid under high pressure is pumped into a low permeability reservoir to initiate fractures that tend to propagate based on dominant stress geometries and stress distribution in the reservoir. To maintain connectivity and potential fluid (reservoir hydrocarbons and trapped fluids) flow through the fractures created by the fluid under pressure, proppant is carried with the fracturing fluid. Proppant includes specific-sized sand or engineered (e.g. to withstand very high pressure) compounds such as ceramics, coated sands, and others. The proppant is injected along with the fracturing fluid (typically water and some chemicals that may include friction reducers, viscosifiers, gels, acid to help dissolve rock, etc.). Even though simulations and rock physics/fracture propagation models have shed some light on fracture creation and growth, many parameters of and for successful/productive fracturing in terms of ultimate hydrocarbon production and recovery have typically been determined experimentally and often by trial and error.

There are several ways known to create fracture networks in "stages" or sections moving from toe to heel (deepest point and the beginning of the horizontal section of a highly inclined or horizontal well), typically referred to as "plug and perf" and sliding sleeve (or similar) methods, that open only a small portion or section of the well or of perforations (openings) to the formation. Methods according to the present disclosure are applicable to plug and perf as well as sliding sleeve methods because measurements can take place before, during and after the pumping of fracturing fluid irrespective of the specific pumping method used in a given section of a well.

Despite recent improvements in understanding production from unconventional fractured reservoirs, current monitoring methods and analysis, such as the passive or "microseismic" monitoring have been less than optimal in obtaining efficient fluid recovery. It has been estimated that only a fraction of stages in a multiple stage fractured well contribute significantly to ultimate hydrocarbon production. Moreover, fracture connectivity (related to permeability) and near well-bore fracture complexity (affecting efficient drainage) seem to show impact on ultimate recovery but are difficult to both infer/measure and design with currently available methods.

The problem of efficient monitoring to optimize fracture treatment design has been approached in many different ways using microseismic and other forms of monitoring (electromagnetic, downhole measurements and logs, or, for example analysis using conductive or activated proppants). Such methods provide some level of information and detail, but have several drawbacks. Typical microseismic or electromagnetic monitoring methods require many sensors, significant processing time and computing resources, and can be labor intensive. In general, such methods can add significant cost, time and labor to the process. In particular, additional significant post-acquisition processing of acquired data to obtain results makes real-time information availability limited or impracticable.

U.S. Patent Application Publication No. 2013/0079935 A1 by Kabannik et al. describes a method using geophones and locates sensors inside a wellbore. The disclosed method does not require any downhole sensors, even though such implementation may enhance some results and requires microseismic data acquisition to take place. Any downhole sensors are operationally difficult and increase costs of measurements. Moreover, the method disclosed in the '935 publication relies on more complex models and required interrupting fracture pumping operations. Furthermore, the first part of the presently disclosed method is not concerned with determining the location of microseismic events, only their detection.

A method for hydraulic impedance testing disclosed in Holzhausen, U.S. Pat. No. 4,802,144, relates to a method for analysis of free oscillations of a connected well-fracture system, the latter of which is assumed to support wave propagation, to obtain fracture geometry (such as length, height and width) by matching the data to pre-existing models or by inversion for the fracture geometry. The '144 patent does not describe either the effects of fracture permeability, nor inversion for wellbore-only parameters, such as tube wave velocity and attenuation.

With reference to U.S. Patent Application Publication No. 2011/0272147 A1, by Beasley et al., the focus of such publication is on sensors disposed near a reservoir but not necessarily sensors hydraulically connected to the reservoir. Beasley et al. discloses performing measurement before and post hydraulic fracturing/stimulation operation. Moreover, the method disclosed in the '147 publication may not be suitable for rapid interpretation.

U.S. Patent Application Publication No. 2012/0069707 discloses using multiple receivers that are ground based, not connected hydraulically to the wellbore, while also requiring reference data and models.

U.S. Patent Application Publication No. 2014/0216729 by McKenna focuses on determining a fracture network volume using microseismic event triangulation and detection from surface based ground sensors, rather than from a direct fluid connectivity of wellbore fluid with the fracture network as the present invention.

U.S. Pat. Nos. 4,907,204 and 7,035,165 B2 are both based on active seismic well sources and well logging inside a wellbore, which uses wireline or similar devices to traverse a borehole and as such may be significantly more expensive and complex to implement in comparison with a single (or only a few) surface based borehole sensor(s).

DETAILED DESCRIPTION

Figure 1:
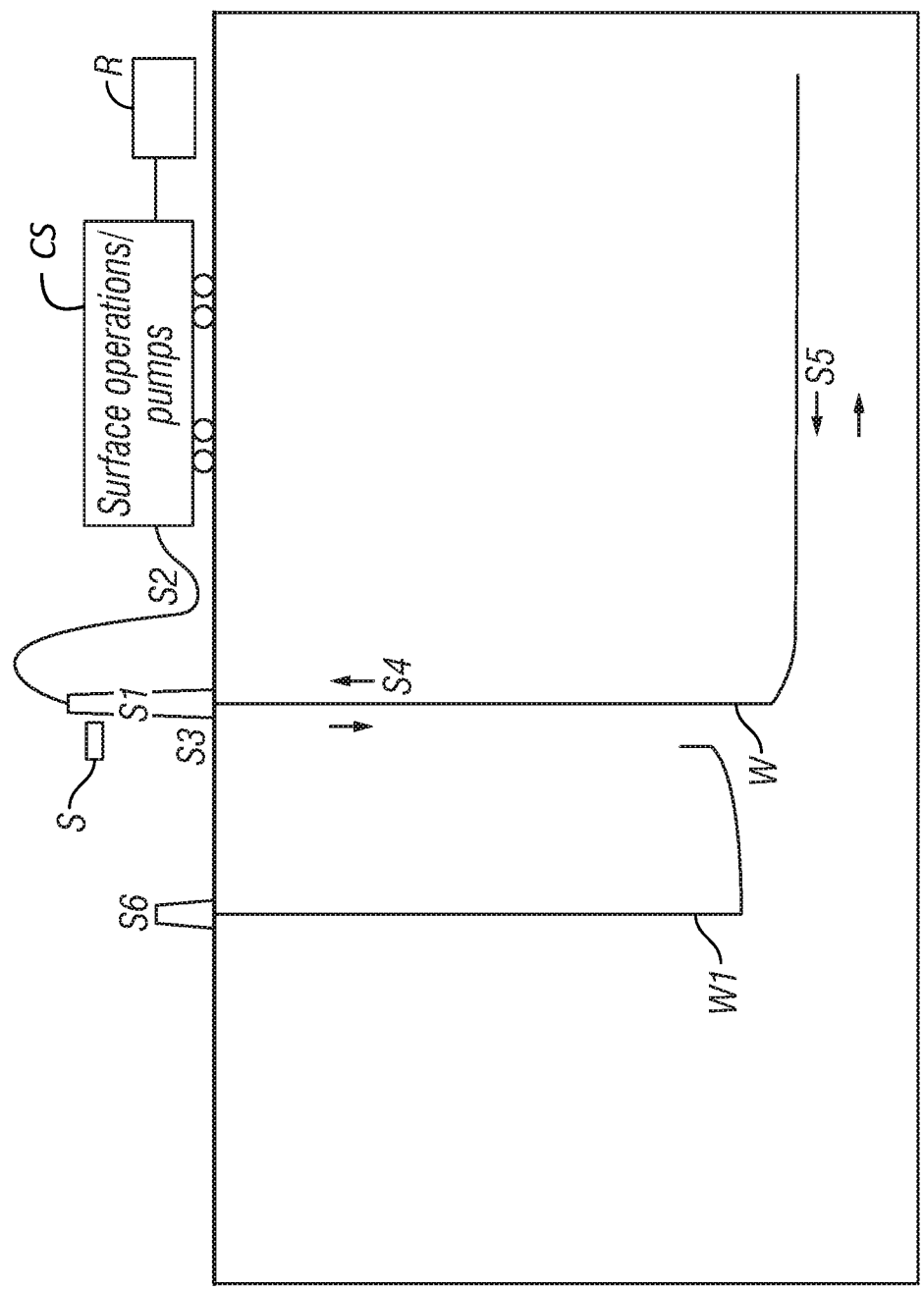
FIG. 1 shows an example embodiment of a data acquisition system that may be used in accordance with the present disclosure.

The discussion below uses specific examples but is not necessarily the only intended or possible implementation or use of the disclosed methods. A person having skill in the art can devise similar implementations to the same goals. Methods according to this disclosure make practical use of pressure waves and pressure disturbances in fracture(s), including the resonance of the combined well-fracture network system, to determine hydraulic fracture network parameters.

During hydraulic fracturing, formations crack or fracture, and fluid with proppant is injected in the opened cracks or fractures. Because fractures may create an interconnected network, the terms "fracture" and "fracture network" may be used synonymously in the description below. Note that given the quantity of injected fluids, there is a geostatistical component and superposition to the sum of fracture sizes and distribution. Also note that this method is applicable to vertical, horizontal, or any other deviated well that undergoes hydraulic fracturing (stimulation) treatment.

Active sources can be water hammer, fracture treatment pumps, pistons, or other type sources specifically designed to generate tube waves or borehole resonances, etc. as described herein below.

Continuous/passive sources are embedded in the operation itself and may include general pumping noise, microseismic events, other geological phenomena not generally related to the fracturing operation (e.g. natural seismicity).

Fractures created during hydraulic fracture fluid pumping may be connected to the wellbore through casing perforations, or slotted-sleeve ports integrated into the completion and, if existing, any previously created or naturally existing fracture network. Logically, only fractures that remain propped/open will contribute significantly to ultimate production from the well. Moreover, fracture geometry has importance in ultimate recovery, well spacing design, well orientation, and even in-stage (within a single well) spacing or perforation designs and spacing. For example, stress shadowing from one fracture, perforation cluster, or fracture network can reduce recovery or propensity to fracture of another nearby stage, cluster, or adjacent well. Note that because methods according to the present disclosure rely on information traveling predominantly through the fluid and interfaces, a hydraulically connected volume is where measurements may be made.

Continuously measuring pressure-related signals and also the rate of change of pressure (these can be pressure fluctuations, or rates of change in pressure such as provided by pressure gauges/transducers and/or hydrophones), how they change, their frequency characteristics, overall phase shift and time of travel, may be related to instantaneous fracture geometry. Comparing measured values with theoretical speed of the wave given the proppant size (which puts a lower limit on a single fracture thickness), fracture geometry and other geophysical parameters can be determined.

The quality factor (Q=resonant (maximum amplitude) frequency/resonance spectral width at half maximum amplitude frequency) of resonances may be estimated and used to infer the fluid communication of fracture networks to the well.

In an embodiment according to the present disclosure, sensors are placed on the surface near, at, or contacting the fluid inside the well. The sensors may include but are not limited to hydrophones that are connected to the wellbore fluid when pumping, other acoustic measurement sensors (to measure ambient noises), accelerometers, pressure transducers, jerk-meters (measure derivative of acceleration), geophones, microphones, or similar sensors. Other physical quantities can also be measured, such as temperature or fluid composition to provide temperature corrections and calibrations or for data consistency checks for all the sensors. Measuring nearby ambient surface noise using microphones, geophones, accelerometers or similar sensors can help in attenuation of noise in fluid pressure or pressure time derivative sensor data (i.e. pump noise as contrasted with fluid resonances due to fractures). Sensors measuring chemical composition and density of the pumped fluid may be used to improve analysis and are therefore implemented in some embodiments. An example arrangement of sensors is shown in FIG. 1. Sensors may be placed on and near (surface or subsurface) a well W as well as an adjacent well W1. The various sensor locations are shown at S1 through S6. Sensors S1, S2, S4, S5, and S6 may be exposed to fluid being pumped throughout a fracturing operation. A pressure or seismic source S may be disposed at or near the position of sensor S1 and may be connected to the well W only when necessary to activate it; it may also be located near a wellbore not directly contacting fluid but generating pressure or seismic signals in the said wellbore. Sensor(s) S3 (surface-based) may be one or more seismic sensors disposed on the ground within about 100 meter(s) of the well W, depending on available access.

Sensor(s) S1 on the wellhead may measure, e.g., pressure, pressure time derivative, temperature. Sensor(s) S2 located near fracture treatment pumps may measure pressure, pressure time derivative, chemical composition, temperature.

More than one sensor on the wellhead (e.g., at S1) is not required, however additional sensors placed proximate to the wellhead can provide higher accuracy, such as directionality of propagating signals, ambient noise records for noise cancelling, ground vibration measurements, steel casing vibrations, etc. and thus methods according to the present disclosure may benefit from using such sensors. In some embodiments all the sensors should have substantial response at ~1 kHz or above.

The signals from the sensors are amplified, filtered, captured, digitized, recorded, stored, and transferred to a computer or similar device for processing, e.g., in a recording unit R which may be disposed proximate the well W. Such recording unit R may be further connected with a control system CS of the entire fracturing operation to detect sensor measurements, analyze the measurements and provide possible feedback control loops to optimize operations and correlate multitude of data streams for final processing (pump rotation speeds, pumping rates, chemical input rates, blender rates, fluid density, sand concentration, etc.).

Although data of primary interest can only be obtained in certain intervals of interest, a continuous stream of data acquired at reasonably high frequencies (up to approximately ~100 kHz) may be beneficial to further analysis and a continuous or near continuous, or continuously-pulsed measurement stream is desirable for microseismic event rate monitoring. In particular, measurements of signals at relatively low and subsonic frequencies (less than about 5 kHz and 20 Hz respectively) are important for fracture characteristic analysis and provide some of the frequency domain information. Higher frequencies may provide higher spatial and time resolution into the fractures and of seismic and other subsurface events, while their penetration depth away from the wellbore may not be as large. The accurate recording of low frequencies is also important in order to detect large fractures (natural or human-made) and larger-scale stimulated reservoir volumes.

Such sensor attachments and connections as described may be made safely using common practices and design principles even though fracturing pressures are very high. Spacing of the sensors and available connections will be specific to a fracturing well-configuration, but in general a sensor should be connected very close to the formation (farther from the fracturing pumps, e.g. on a wellhead) or close to the master valve and hydraulically connected to the formation. Exceptions may include secondary sensor(s), e.g., S2 on the pumping flowline, that can be correlated with the measurements made by a sensor, e.g., at S1 (S1→S2 or S2→S1) to infer traveling wave linear directionality in the flowline and thus in the well.

As stated above, more than one sensor is not required, however additional sensors can provide higher accuracy, such as directionality of propagating signals, ambient noise records for noise cancelling, ground vibrations, steel casing vibrations, etc. Thus having more than one sensor is included in FIG. 1. Measurements from the various sensors may be time synchronized. One method of synchronizing sensors is using GPS time signals at the sensors or on the recording system R (if the sensors are far apart). Combining all real-time sensor measurement streams into a single common data acquisition unit, e.g. the recording unit R could obtain the same objective.

Sources of signals that excite resonant frequencies in the combined well-fracture network will come from, including but not limited to: pumping and pumping changes; performing nearby perforations; nearby geologic activity; AND surface or borehole-based time-limited/pulsed energy sources. In addition, continuous sources (valves, pumps such as are already used), or micro-seismic events, microseismic/fracture activity are broadband sources well-suited to excite such resonant frequencies. In particular, inside reservoir induced (by ongoing hydraulic fracturing operation in the well of interest or a nearby well while pumping) microseismic activity, is important in generating some of the signals and fracture waves.

Figure 2:
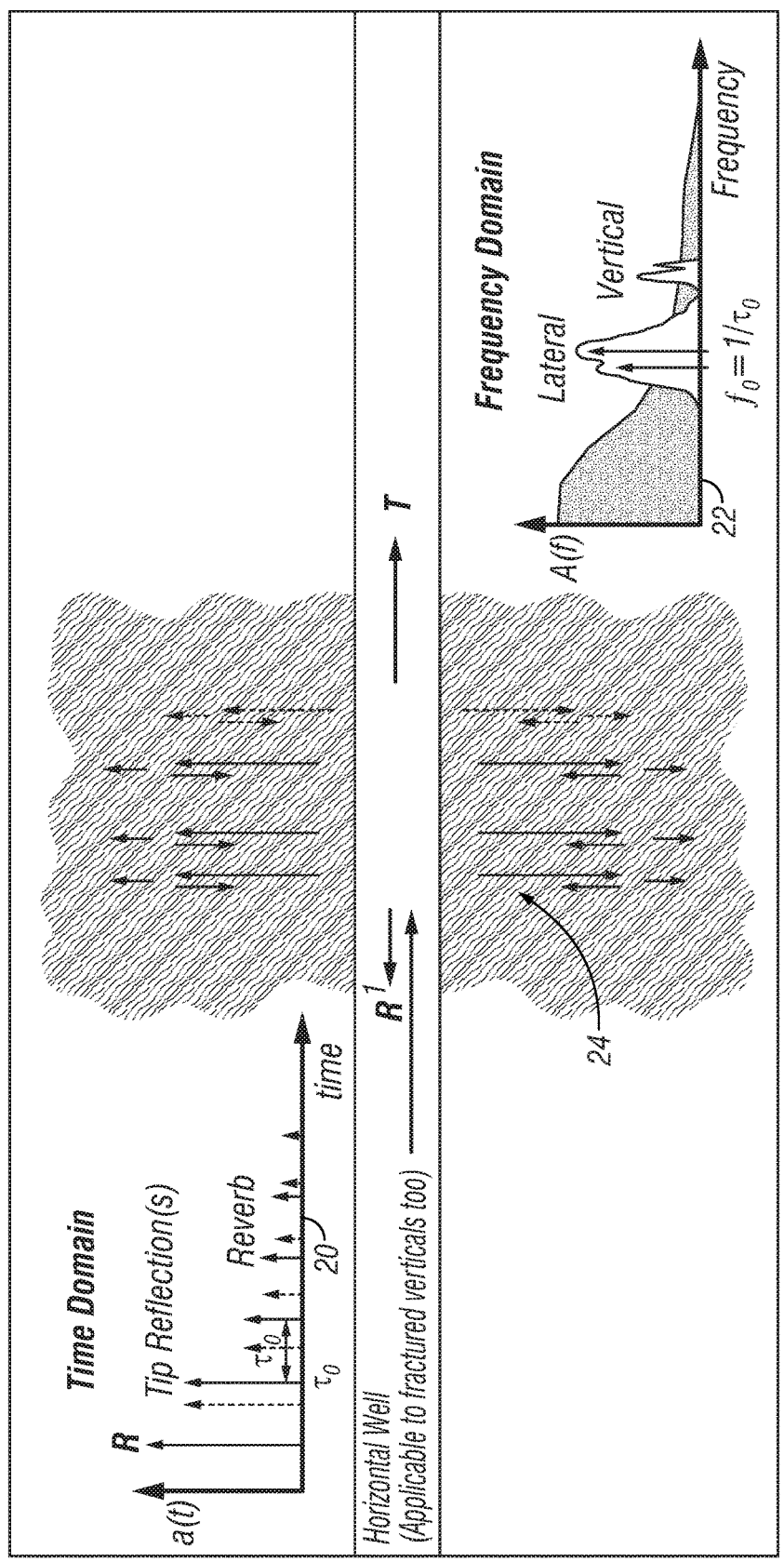
FIG. 2 shows an example geophysical model of subsurface formations being fractured and measurements made according to the disclosure to characterize the fractures. It also shows the resonances driven in fractures through pumping and microseismic activity.

FIG. 2 shows an example geophysical model of the well traversing subsurface formations, fractures 24 created by or enhanced by fracture treatment pumping, measurements obtained using a method according to the present disclosure and analysis of the measurements. Traveling fluid pressure waves are shown schematically at R1 in the graph at 20 being reflected pressure wave in the wellbore, and T representing transmitted pressure waves in the wellbore with time difference of $\tau_0$. FIG. 2 shows graphic representations of the transmitted pressure wave T with respect to time superimposed on the reflected pressure wave R1 and its reverberations on the graph at 20. Frequency domain analysis is shown schematically on the graph at 22.

Figure 3:
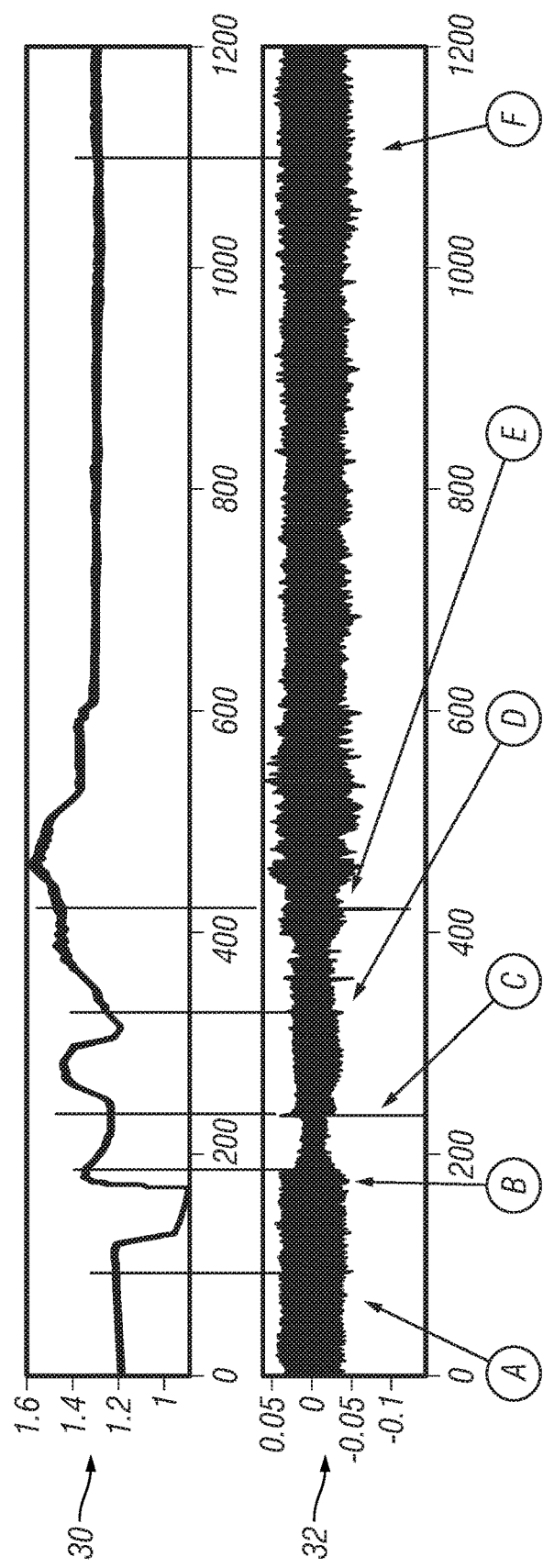
FIG. 3 shows an example of data recording and analysis. The top frame shows pressure at a selected position in or along a well (arbitrary units), the middle frame shows hydrophone or acoustic pressure change (time derivative) data, the bottom frame (pg 4/8) shows examples of characteristic times and events.
Figure 3:
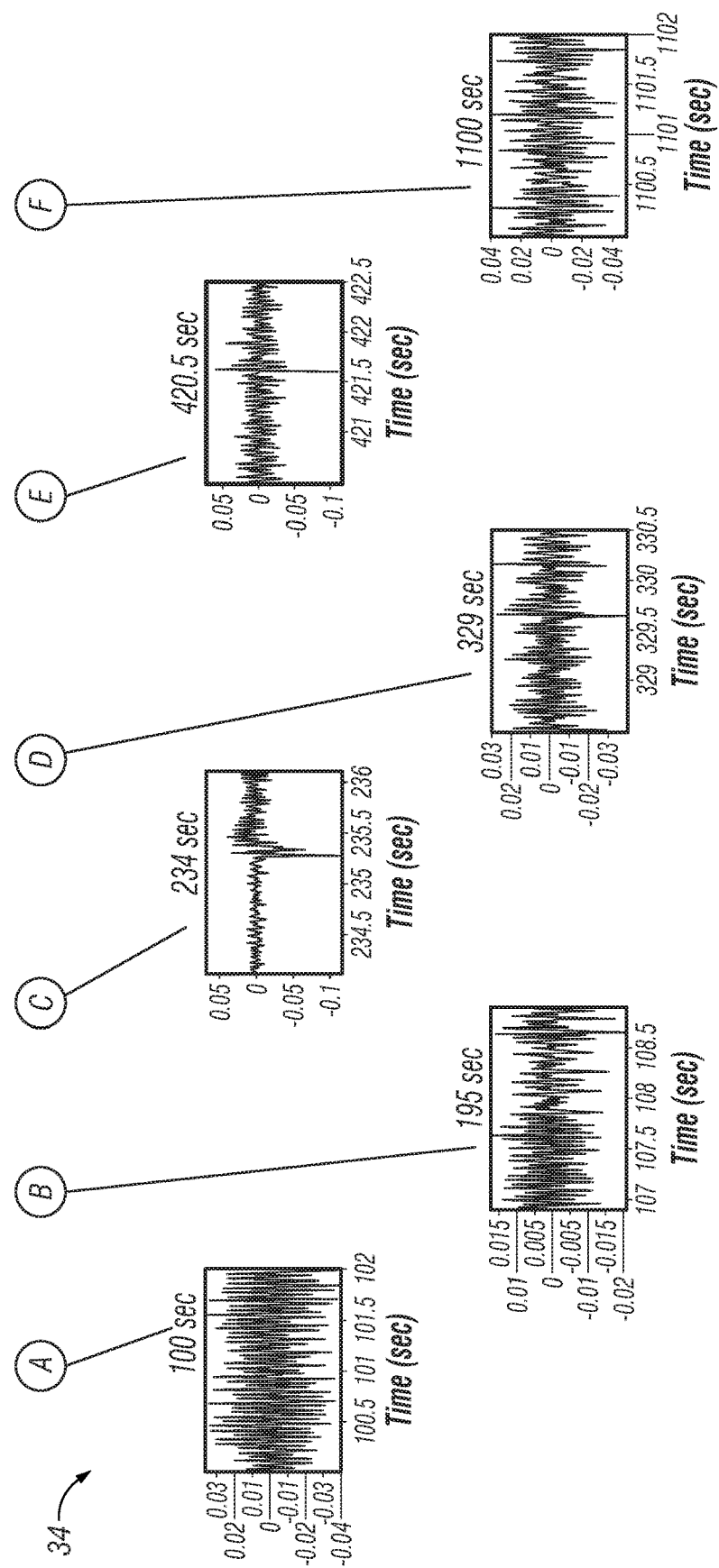

Measurements acquired during a fracture treatment pumping stage may be similar in characteristics to what is shown in FIG. 3. Note that a rapid pressure change generates an acoustic signal (can be subsonic <20 Hz, or supersonic >20 kHz) and often may be referred to as such. This signal in turn, may generate an "echo" returning from the subsurface region of the well (a representative single pulse in FIG. 4A.).

The upper frame 30 in FIG. 3 shows pressure applied to a well with respect to time as measured, e.g., at sensor S1 in FIG. 1 over a longer time period (hundreds of seconds). The middle frame 32 shows a graph of the time derivative of the measured pressure. The lower frame 34 shows graphs of time derivative of the measured pressure with reference to specific events occurring in the well and in the formations penetrated by the well. During a common hydraulic fracturing operation, a ball-seating plug is set at a selected depth in the well, then a sealing ball is pumped down the well at a modest rate (few or tens of barrels per minute, e.g., 100 seconds in the upper frame 30), slowing down before the ball engages a plug (e.g., at 195 seconds in FIG. 3). Immediately after the ball seats—at which point if chosen based on formation composition, properly used and spotted, acid would reach the area of perforations in the well casing and the formation—the pressure builds up. At ~200 seconds in FIG. 3, the pressure rises to the point where fractures in the newly pressured fracture treatment stage start to open. A steep pressure increase shown in the upper frame 30 indicates that the present fracture treatment stage is hydraulically isolated from the previous fracture treatment stage.

As more fracturing fluid is pumped and the fluid pumping rate increases, fractures continue propagating in the formation. Operators typically increase the rate of pumping until a target rate is reached (tens, sometimes about 100 barrels per minute-bpm), which also generally increases the fluid pressure and the pressure exerted on the subsurface formation. Once a target planned "sweet spot" or optimized pumping rate is reached, the operator may maintain that pumping rate unless unexpected behavior (pump failures, screen-out, or unexpected pressure rise) and safety considerations or feedback from methods as disclosed herein dictate otherwise. For example pressure and pumping rate can be changed to overcome friction and to mitigate growth of fractures. During this time, proppant is typically added to the pumped fluid to keep fractures open after the pressure on the fracturing fluid is relieved.

In FIG. 3, note in the lower frame 34 measurements corresponding to pump noise, pressure changes with ball seating, a microseismic event identified around 420.5 seconds and a stabilized pumping noise and pressure signals during this time. Measuring, detecting, and providing real-time feedback of the microseismic events thus detected may also be valuable. Coming from a single or a small number of sensors, this data can be made readily available and processed in real-time.

In its simple form, only knowing how many formation-breaking, i.e. microseismic, events occur per unit time may show how much the formation has been fractured and can be combined with additional information (such as but not limited to fully passive microseismic analysis) for even more comprehensive understanding. Real-time aspects of the pressure and pressure time derivative measurements can be useful as the operator may want to maintain a certain formation-breaking/fracture creating rate (microseismic events per unit time interval) to optimize fracture creation for maximum hydrocarbon recovery.

Time-frequency analysis may be used to show change of the pressure wave spectrum over time. Frequency domain analysis, such as may be provided by a Fourier transform can then have a better resolution in the time-frequency stationary period.

In some embodiments, measurements from a plurality of sensors such as shown in FIG. 1 comprising pressure transducers, accelerometers, hydrophones, or geophones may be used to reduce surface-based noise, reconfirm the existence of strong events, and/or to eliminate certain frequencies in the signals such as those originating from the pumps or surface activity instead of the reservoir and/or fractures or subsurface signals carried though the wellbore.

Inversion of the Measurement

The inversion of the measurement to determine physical parameters describing the fractures and fracture network requires a description of how pressure disturbance(s) interact(s) with the fractures, the fracture network, the wellbore and the system comprised by these parts. Within all elements of the system and its component parts pressure disturbances obey a second-order in time differential equation composed of terms that describe wave propagation and terms that describe diffusion behavior. The relative amplitude of each of these terms differs in the wellbore and in the fracture and fracture network.

In the wellbore, the wave propagation terms dominate and the pressure disturbance propagates as a wave with relatively little attenuation. Except in unusual circumstances in the fracture and fracture networks, the diffusion terms dominate and the amplitude of the pressure disturbance decays rapidly with relatively little wave-like nature. Only in unusual circumstances are interface waves, such as Stoneley waves, Scholte waves, Rayleigh waves, Love waves and Krauklis waves, excited, and such waves propagate within the fractures and fracture network.

A specific method will now be explained to invert the data based on the above understanding. Those skilled in the art will understand that the specific method may be modified or extended in whole or in part. The method, which inverts the data based on the above understanding, will now be explained. The explanation of an example embodiment of the method uses a model (see, e.g., Mathieu and Toksoz, 1984; Hornby et al., 1989; Kostek et al., 1998a; Henry, 2005), to describe tube wave reflection from fractures. Important elements of this disclosure refer to complex-valued frequency dependent reflection coefficient, proppant filled Darcy flow, and elastic compliance of the fractures as described in paragraphs below. Tube waves at the frequencies of interest are idealized as pressure waves obeying the wave equation with speed $c_T$ (Biot, 1952). Attenuation during propagation is accounted for using a frequency-independent quality factor $Q_T$, not to be confused with wellhead flow rate $Q(t)$.

The borehole may be sealed with a packer, and fractures have been created through several perforation clusters in the casing. At low frequencies of interest, wavelengths of tube waves are sufficiently large that it may be assumed that all fractures effectively experience the same pressure at their junction with the borehole. Tube waves thus reflect from the set of fractures and packer collectively, rather than from individual fractures. The tube wave reflection coefficient for this geometry may be determined by the expression:

$$R(\omega) = \frac{Z_f(\omega) - Z_T}{Z_f(\omega) + Z_T}, \quad (1)$$

where $Z_T = r_T c_T / A_T$ is the tube wave hydraulic impedance (for a borehole fluid density $r_T$, tube wave speed $c_T$, and borehole cross-sectional area $A_T$) and $Z_f(\omega)$ is the hydraulic impedance of the set of fractures and packer that terminates the portion of the borehole that is hydraulically connected to the wellhead.

Here, $R(\omega)$ is a complex-valued, frequency-dependent reflection coefficient, and hydraulic impedance $Z$ is defined as the ratio of pressure change to change in volumetric flow rate. The wellhead pressure with respect to time $P(t)$, in response to an imposed wellhead flow rate $Q(t)$, may be expressed in the frequency domain as:

$$\hat{P}(\omega) = Z_T \hat{Q}(\omega) \frac{1 + g(\omega) R(\omega)}{1 - g(\omega) R(\omega)} \quad (2)$$

$$= Z_T \hat{Q}(\omega) \left\{ 1 + 2 \sum_{n=1}^{\infty} [g(\omega) R(\omega)]^n \right\},$$

for reflection coefficient $R(\omega)$ given in Eq. (1) and two-way travel time factor $g(\omega)$ that accounts for attenuation and causality preserving dispersion (See, e.g., Aki and Richards, 2009):

$$g(\omega) = \exp\left( \frac{2i\omega h}{c_T} \left[ 1 - \frac{\ln(\omega/\omega_0)}{\pi Q_T} \right] - \frac{|\omega| h}{c_T Q_T} \right), \quad (3)$$

where $h$ is the borehole length and $\omega_0$ is a reference angular frequency at which the tube wave phase velocity equals $c_T$. The second form of Eq. (2) highlights the infinite sequence of reflections. In numerical time-domain examples to follow, we construct the solution first in the frequency domain and then invert the transform using a fast Fourier transform.

Single Fracture

Consider a single, one-sided fracture as a planar crack extending in the positive x direction away from the borehole to a distance L. The fracture has cross-sectional area A in the y-z plane (e.g., for an elliptical cross-section, $A=\pi wH/4$, with maximum width w and height H). The fluid pressure p is assumed to be uniform across this cross-section, but is permitted to vary in the x direction; i.e., $p=p(x; t)$. The fracture is filled with proppant (porosity $\phi$ and permeability k) and fluid (density $\rho$ and dynamic viscosity $\mu$). The volumetric flow rate of fluid along the fracture in the x direction is denoted as $q(x; t)$. The hydraulic impedance of this fracture is defined using pressure and volumetric flow rate at the fracture mouth, $p_0(t)=p(0,t)$ and $q_0(t)=q(\mathbf{0}, t)$, respectively, as $Z_0(\omega)=\hat{p}_0(\omega)/\hat{q}_0(\omega)$.

An objective is to derive $Z_0(\omega)$ for a single, one-sided fracture. Conservation of fluid mass may be represented as:

$$\frac{\partial(\rho\phi A)}{\partial t} + \frac{\partial(\rho q)}{\partial x} = 0, \qquad (4)$$

assuming negligible leak-off over the short time scales of interest. Next, we rewrite (4) as an equation for pressure perturbation p(x, t) within the fracture. Perturbations are assumed sufficiently small so as to justify linearization. Following standard procedures in linear poromechanics, it may be assumed that r and f depend on the local pressure p, and define fluid and pore compressibilities as $\beta_f=\rho^{-1}(\partial\rho/\partial p)$ and $\beta_f=\phi^{-1}(\partial\phi/\partial p)$ respectively.

It may also be assumed that a local elasticity relation in which changes in A depend only on the local pressure. This assumption is used in several simple models of hydraulic fractures (e.g., the PKN model, see, Nordgren, 1972). With this assumption, the crack compliance may be defined as $\beta_A=A^{-1}(\partial A/\partial p)$. As an example, if it is assumed that the fracture height H is much less than wavelengths characterizing the pressure perturbations in the x direction, then plane strain conditions prevail within the plane of the cross-section. This permits use of the standard solution for a uniformly pressurized mode I crack, for which changes in width $\Delta w$ are related to changes in pressure $\Delta p$ by $\Delta w=(H/G^*)\Delta p$ with $G^*=G/(1-v)$ for solid shear modulus G and Poisson's ratio v. It follows that the crack compliance is $\beta_A=(H/w)(G^*)^{-1}$.

The general definitions of compressibilities and the crack compliance are then used to rewrite the first term in the mass balance Eq. (4) in terms of the pressurization rate $\partial p/\partial t$. In addition, Darcy's law states that:

$$q = -\frac{kA}{\mu}\frac{\partial p}{\partial x}. \qquad (5)$$

With these substitutions, the mass balance in Eq. (4) becomes the diffusion equation for pressure perturbation p(x; t) within the fracture:

$$\rho\phi A\beta\frac{\partial p}{\partial t} = \frac{\partial}{\partial x}\left(\frac{\rho kA}{\mu}\frac{\partial p}{\partial x}\right), \qquad (6)$$

where $\beta=\beta_f+\beta_f+\beta_A$ is the total compressibility/compliance. The diffusivity and diffusion length are, respectively:

$$D = \frac{k}{\mu\phi\beta} \text{ and } L_D = \sqrt{D/\omega}. \qquad (7)$$

Consistent with the assumption of small perturbations, Eq. (6) is linearized and all coefficients (i.e., S, $\rho$, k, A and $\mu$) are evaluated at reference conditions. In all examples below, one may assume spatially uniform properties.

When the fracture is much longer than the diffusion length $(L_D \ll L)$, as is typically the case in our experience, the solution to Eq. (6) for imposed volumetric flow rate $q_0(t)$ at the fracture mouth x=0 is, in the frequency domain:

$$\hat{p}(x, \omega) = \hat{q}_0(\omega)\frac{\mu}{kA}\sqrt{\frac{D}{-i\omega}} \exp\left(-\sqrt{\frac{-i\omega}{D}}x\right). \qquad (8)$$

The hydraulic impedance of this single, one-sided fracture is:

$$Z_0(\omega) = \frac{\mu}{kA}\sqrt{\frac{D}{-i\omega}} = \sqrt{\frac{\mu}{-i\omega\phi\beta kA^2}}. \qquad (9)$$

Multiple Fractures

Now consider a small section of the borehole hydraulically connected to a set of N fractures, each extending bilaterally away from the borehole, and terminated by an impermeable, rigid plug. Elastic interactions between the fractures are neglected. It may be assumed that all fractures experience the same pressure $p_0(t)$ at their junction with the borehole, and one may define $q_i(t)$ as the volumetric flow rate into fracture i (i=1, . . . , N). The hydraulic impedance of the fracture set is:

$$Z_f(\omega) = \frac{\hat{p}_0(\omega)}{2\sum_{i=1}^{N}\hat{q}_i(\omega)}, \qquad (10)$$

where the denominator in Eq. (10) is the total volumetric flow rate into all N fractures, and the factor of two is because the fractures extend laterally from both sides of the borehole (x>0 and x<0). If it is further assumed that all fractures are effectively identical, each having hydraulic impedance $Z_0(\omega)$, then $Z_f(\omega)=Z_0(\omega)/2N$.

Compliant, Elliptical Crack Model

As a specific example, suppose that the compressibility or compliance b is dominated by the crack compliance $\beta_A$, such that $\beta \sim (H/w)(G^*)^{-1}$. Using this expression, and assuming elliptical cross-section ($A=\pi wH/4$), the hydraulic impedance of N bilateral fractures, in the small diffusion length limit of Eq. (9), reduces to $$Z_f(\omega) = \frac{2}{\pi N}\sqrt{\frac{G^*\mu\phi}{-i\omega kwH^3}}. \qquad (11)$$

Eq. (11) will be used in the remainder of this disclosure, together with Eq. (1) and Eq. (2), to interpret data.

Active Source Measurement

Figure 4A:
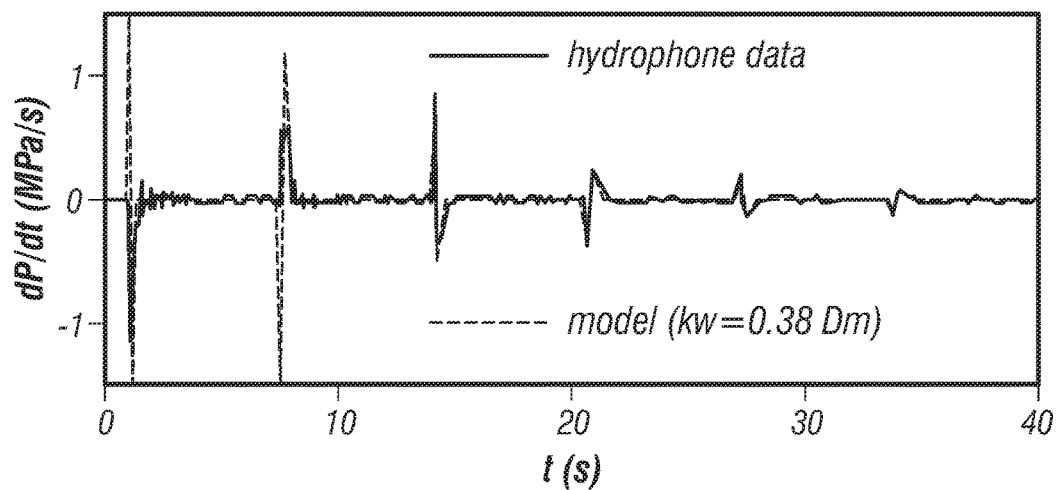
FIG. 4A shows a graph of a representative active source hydrophone time series.

FIG. 4A shows a representative active source hydrophone time series along with the best-fitting model. The source is idealized as a Gaussian modulation of wellhead flow rate, $Q(t) \sim \exp(-(\omega T)^2/2)$, for source duration T. Setting representative values $c_T$=1460 m/s, h=4805 m, G=13:3 GPa, N=6, H=10 m, ϕ=0.5, and μ=5×10$^{-3}$ Pa s, one may then vary the fracture conductivity kw, borehole quality factor $Q_T$, source duration T, and source amplitude to minimize the waveform misfit in the $L_2$ norm. It may be determined that $Q_T$~70, T~0.055 s, and kw~0.38 D m.

Figure 4B:
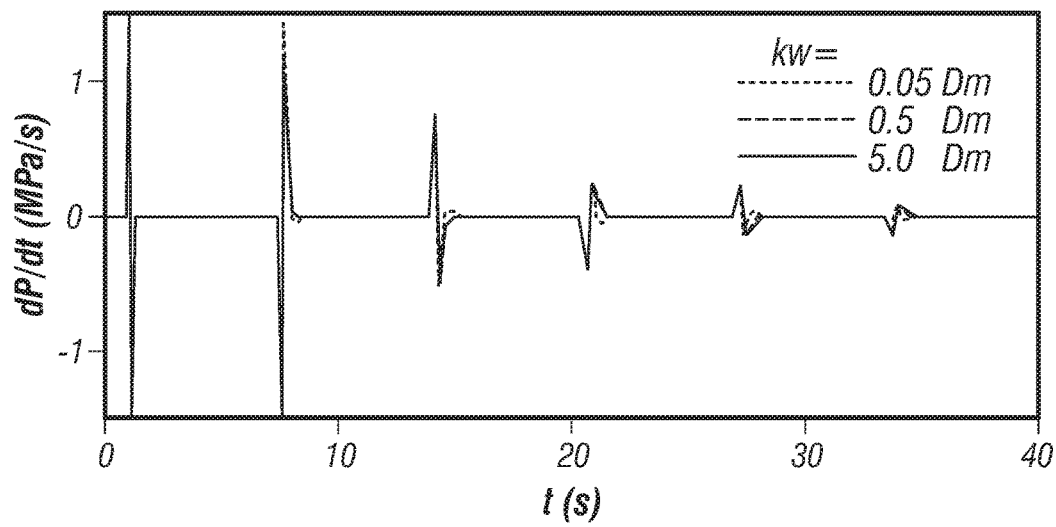
FIG. 4B illustrates how conductivity kw affects waveforms.
Figure 4C:
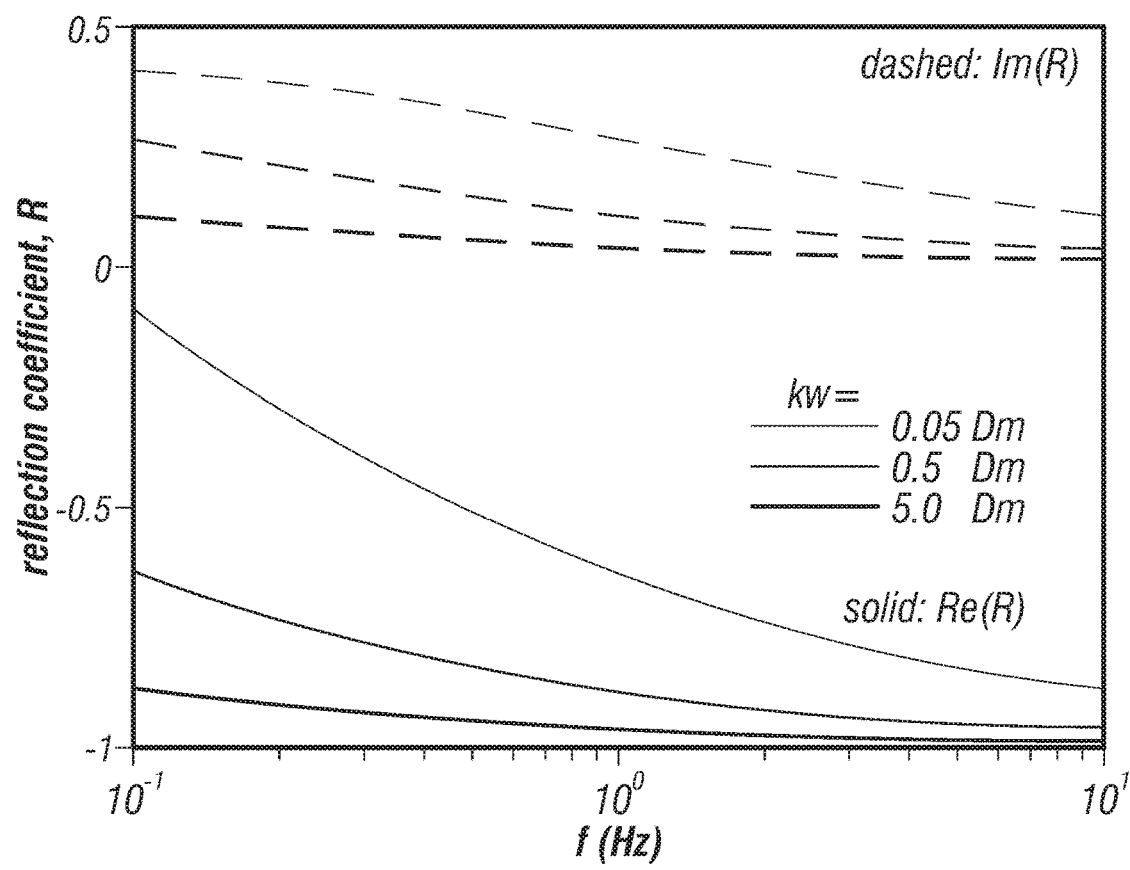
FIG. 4C shows how the reflection coefficient R depends on kw.

FIG. 4B illustrates how conductivity kw affects waveforms. This is because the reflection coefficient R depends on kw as shown in FIG. 4C. The real part of R is negative, and R→1 at high frequencies and for highly conductive fractures (large kw). In this limit, the fracture hydraulic impedance is much less than the tube wave impedance ($Z_f$<<$Z_T$), such that waves reflect as if from a constant pressure (i.e., "open") end. At lower frequencies, and also for less conductive fractures (smaller kw), the fracture hydraulic impedance increases, and the reflection coefficient shows appreciable differences from the open-end limit. For even smaller kw than shown in the FIG. 4C, $Z_f$>>$Z_T$ and R→1 (i.e., "closed" end).

The inferred value for conductivity, kw~0.38 D m, is reasonably consistent with independent estimates of width w and proppant pack permeability k. First, it should be emphasized that the measurement alone cannot provide separate constraints on k and w. For example, the inferred conductivity is consistent with w=1 mm and k=400 D, w=1 cm and k=40 D, or w=0.1 m and k=4 D. Laboratory measurements of proppant pack permeability (See, e.g., Lee et al., 2010) show values around 100 D, for which the inferred width is 4 mm.

Water Hammer Measurement

Figure 5A:
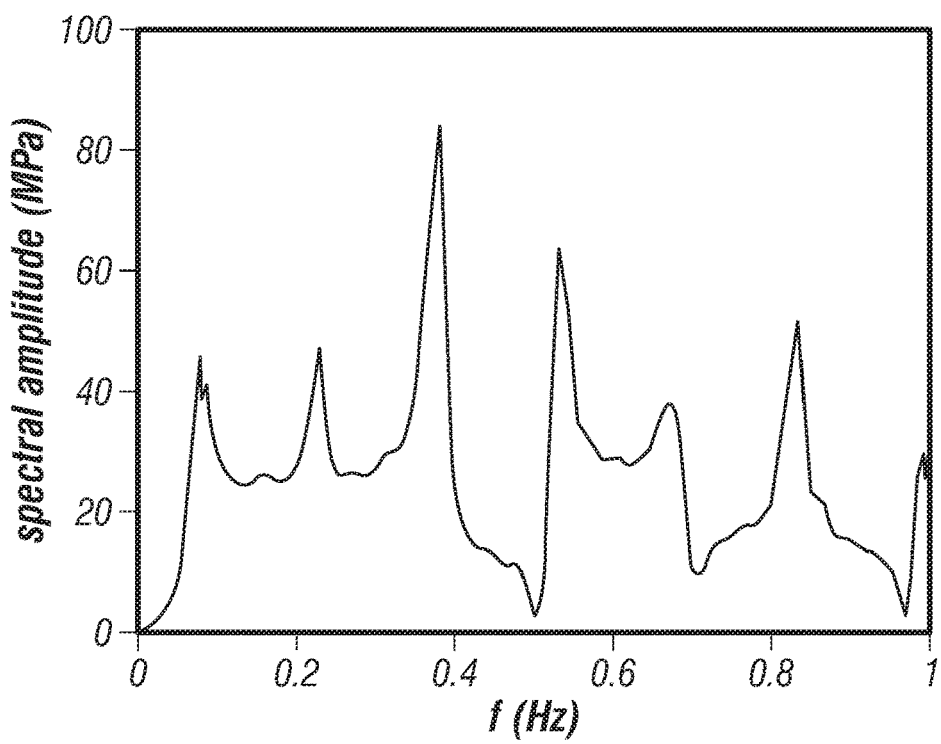
FIG. 5A shows the hydrophone Fourier spectrum from water hammer.
Figure 5B:
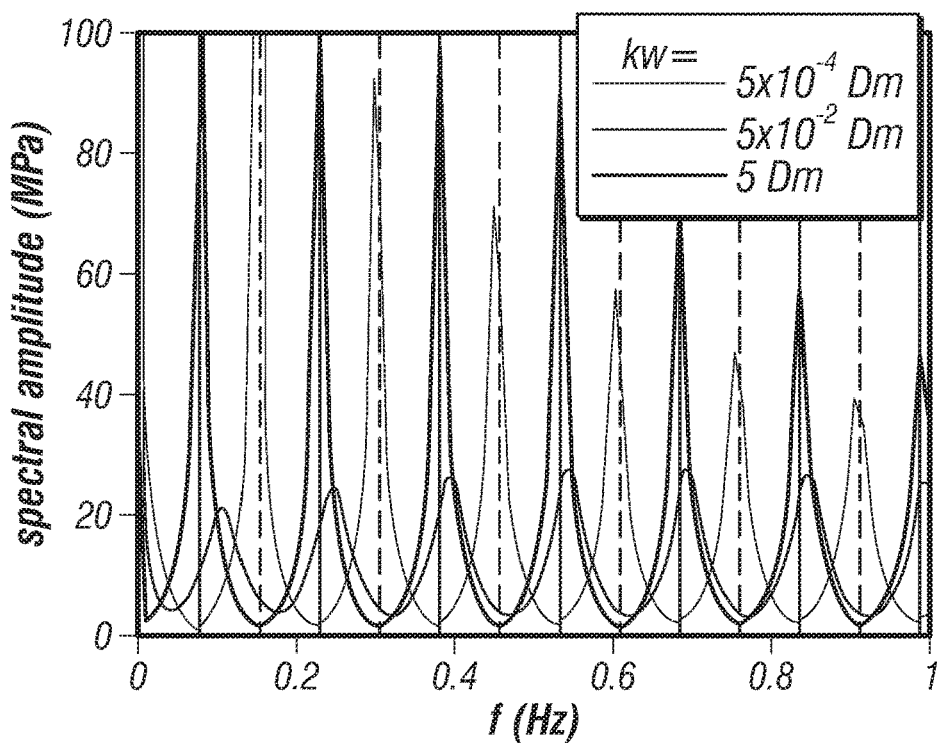
FIG. 5B shows the sensitivity of modeled spectra to fracture conductivity kw.

Next, t data may be interpreted in the frequency domain. FIG. 5A shows the hydrophone Fourier spectrum from water hammer produced when pumps are shut off at the end of the stage (ISIP water hammer). The multiple spectral peaks are the resonant modes of the borehole-fracture system. The resonance frequencies of open- and close-ended tubes are well known. The present example embodiment of a model predicts a continuous transition between these limits as the hydraulic impedance ratio, $Z_f/Z_T$, is varied. FIG. 5B shows the sensitivity of modeled spectra to fracture conductivity kw.

To demonstrate this, one may apply the model with the same parameters as before but with the source flow rate Q(t) idealized as a step function. FIG. 5B shows graphically how kw influences the spectra. The resonance frequencies transition from the closed-end limit for small kw to the open-end limit for large kw. Since the actual source time function is more complicated than a step function, the model may be fit to the data by matching the frequencies and quality factors of individual resonances, rather than attempting to directly match the spectrum. This procedure, not illustrated here, provides values reasonably consistent with those inferred from the active source full waveform inversion.

Interpretation of the Inversion Results

In the preceding section is described one specific method of inverting the data for a parameter kw/μ which controls the rate at which fluid flows into and out of the fracture and which may be designated as the conductivity of the fracture or fracture network. This is a relevant factor in the subsequent production of hydrocarbons.

In addition, by repeating this measurements at least two distinct times before, during or after the pumping of a fracture treatment, it is possible to calculate the change, or rate of change, of the conductivity which provides information on the effectiveness of the fracturing treatment. The initial, "baseline" measurement may also be taken from another dataset of similar parameters of well and formation to estimate such a change.

In addition, by examining the conductivity calculated from resonances at comparatively low frequencies, intermediate frequencies and high frequencies can be analyzed. Different frequencies are sensitive to different ranges of investigation with low frequencies extending furthest and high frequencies extending the least distances. Thus, from comparison of the conductivity estimates made at different frequencies it is possible to estimate the conductivity, conductivity changes and rates of conductivity change at different distances from the perforations.

Thus, the calculation of conductivities and their change with respect to time can be interpreted as originating from the spatial distribution of changes in conductivity, and consequently one can infer the distribution of proppant and its change with time.

Furthermore, the distribution of proppant as a function of distance from the perforation can be interpreted in terms of the complexity of the fracture network. A situation where the known total volume of proppant is distributed equally with respect to distance from the well is expected to be the result of a relatively simple fracture network. Conversely, when the known total volume of proppant is highly concentrated near the well it is expected that a complex fracture network exists. This complex fracture network provides both the volume to contain the proppant and the complexity which traps the proppant and prevents it from being carried further from the well.

Furthermore, it is possible to identify segments of a borehole (stages) that contain fractures that exhibit significantly larger, or significantly smaller changes in conductivity caused by hydraulic fracturing. These segments can be correlated, or otherwise associated, with particular geological characteristics of the formation in which the borehole is situated. These geological characteristics are typically determined from lithological logs, or other logs (e.g., rate-of-penetration logs) recorded while drilling the borehole or using data acquired after drilling acquired on, for example, wireline. Once this correlation, or association, of fractures yielding high or low conductivities with particular features of lithological or other logs has been established, it can then be used to plan perforation and hydraulic fracture location in other boreholes to optimize operations and production. For example, if it is established by correlation or other comparison that portions of the well that exhibited low rates-of-penetration while drilling also tend to produce high conductivity fractures, then in subsequent wells it may be possible to locate the perforations (where the fractures originate) in segments of the well that exhibited low rates-of-penetration when they were drilled. As another example, if it is established that high conductivity fractures are associated with silica-rich portions of the formation, in future wells one can position the perforations primarily in silica-rich segments of the well; then high conductivity fractures may be expected in other wells drilled through silica-rich formations or portions thereof. Many other correlations between fracture characteristics and lithology (formation mineral composition) or geomechanical characteristics (e.g., bulk and elastic moduli, Poisson's ratio, compressive and tensile strength) of the formation are possible.

Figure 6:
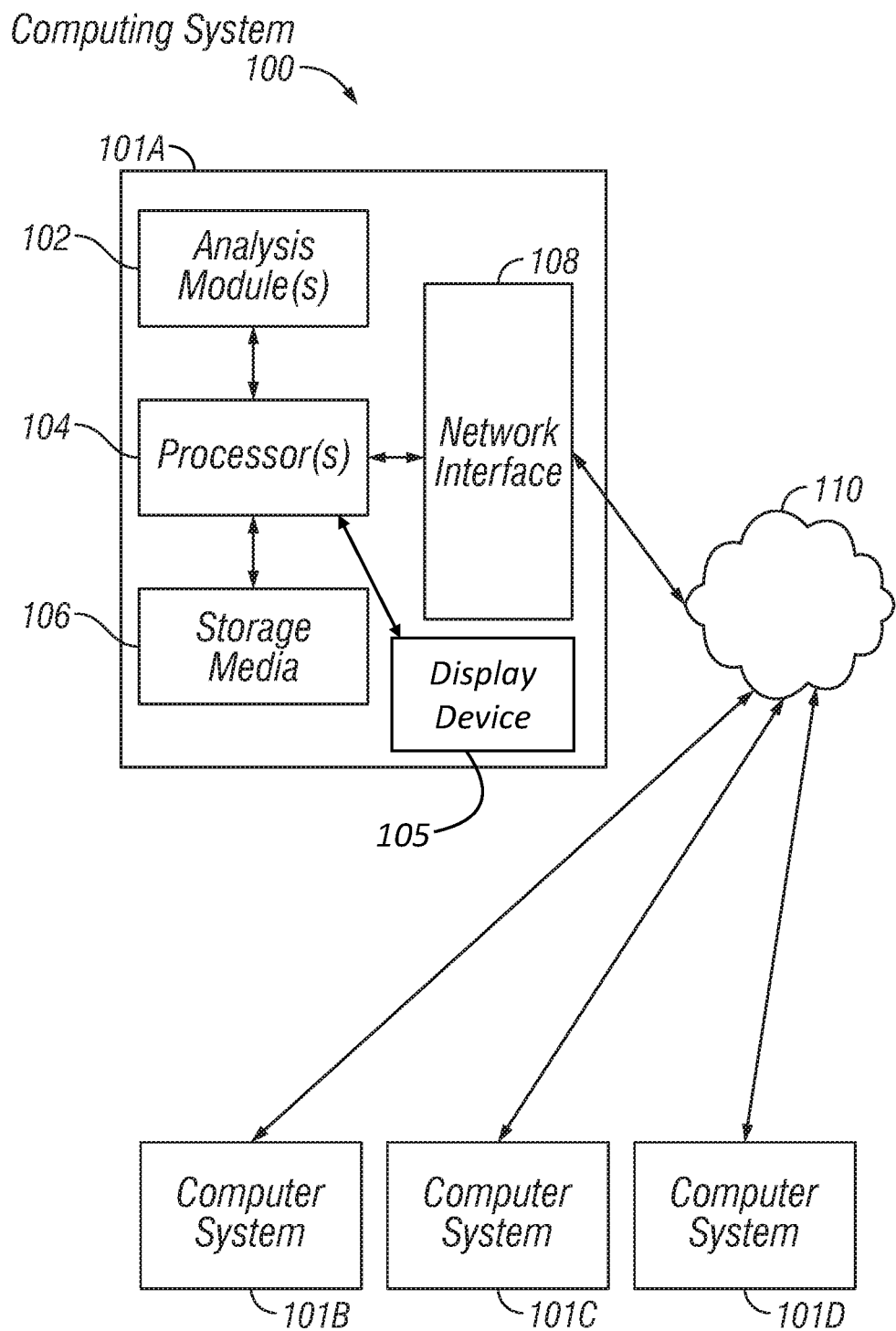
FIG. 6 shows an example embodiment of a computer system that may be used in some embodiments.

FIG. 6 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIGS. 2, 3, 4A, 4B, 4C, 5A and 5B. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 6 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 6, and/or the computing system 100 may have a different configuration or arrangement of the components shown in FIG. 6. The various components shown in FIG. 6 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

REFERENCES CITED IN THIS DISCLOSURE

Aki, K., and P. G. Richards, 2009, Quantitative Seismology: University Science Books.
Biot, M., 1952, Propagation of elastic waves in a cylindrical bore containing a fluid: Journal of Applied Physics, 23, 997-1005.
Henry, F., 2005, Characterization of borehole fractures by the body and interface waves: TU Delft, Delft University of Technology.
Hornby, B., D. Johnson, K. Winkler, and R. Plumb, 1989, Fracture evaluation using reflected Stoneley-wave arrivals: Geophysics, 54, 1274-1288.
Kostek, S., D. L. Johnson, and C. J. Randall, 1998a, The interaction of tube waves with borehole fractures, part i: Numerical models: Geophysics, 63, 800-808.
Lee, D. S., D. Elsworth, H. Yasuhara, J. D. Weaver, and R. Rickman, 2010, Experiment and modeling to evaluate the effects of proppant-pack diagenesis on fracture treatments: Journal of Petroleum Science and Engineering, 74, 67-76.
Mathieu, F., and M. Toksoz, 1984, Application of full waveform acoustic logging data to the estimation of reservoir permeability: Technical report, Massachusetts Institute of Technology. Earth Resources Laboratory.
Nordgren, R., 1972, Propagation of a vertical hydraulic fracture: Society of Petroleum Engineers, 12, 306-314.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for characterizing a hydraulic fracture in a subsurface formation, comprising:
   inducing a pressure change in a well drilled through the subsurface formation, the inducing a pressure change inducing tube waves in the well;
   measuring at a location proximate to a wellhead at least one of pressure and a time derivative of pressure in the well for a selected length of time; and
   determining at least one of a value of and change in the value with respect to time of the mathematical product of fracture permeability and fracture width divided by viscosity of a fluid, of at least one fracture in a formation adjacent to the well using tube wave components of the measured at least one of pressure and the time derivative of pressure.

2. The method of claim 1 wherein the inducing a pressure change comprises pumping a hydraulic fracture treatment.

3. The method of claim 2 wherein the at least one of the value, and the change in the value with respect to time is determined before the pumping the hydraulic fracture treatment.

4. The method of claim 2 wherein the at least one of value, and a change in the value with respect to time is determined during the pumping the hydraulic fracture treatment.

5. The method of claim 2 wherein the at least one of a the value, and a change in the value with respect to time is determined after the pumping the hydraulic fracture treatment.

6. The method of claim 1 wherein the inducing a pressure change comprises water hammer generated by changing a flow rate of fluid into or out of the well.

7. The method of claim 1 wherein the inducing a pressure change comprises operating an acoustic source which propagates a positive and/or negative pressure pulse into fluid within the well.

8. The method of claim 1 further comprising determining a number of fractures or change in the number of fractures with respect to time.

9. The method of claim 1 further comprising determining fracture width or change in fracture width with respect to time.

10. The method of claim 1 further comprising determining fracture height or change in fracture height with respect to time.

11. The method of claim 1 further comprising determining fracture length or change in fracture length with respect to time.

12. The method of claim 1 further comprising determining fluid conductivity or change in conductivity with respect to time of the at least one fracture.

13. The method of claim 1 further comprising determining fluid connectivity to the well or change in the fluid connectivity to the well with respect to time.

14. The method of claim 1 further comprising determining spatial variation of fracture conductivity or change in the spatial variation with respect to time.

15. The method of claim 1 further comprising determining proppant spatial distribution or proppant change in the spatial distribution with respect to time.

16. The method of claim 1 further comprising determining drainage volume or change in drainage volume with respect to time.

17. The method of claim 1 further comprising determining fracture complexity or change in fracture complexity with respect to time.

18. The method of claim 1 wherein the at least one of the value and the change in the value with respect to time is determined from at least one of reflection time, reflection phase and reflection amplitude.

19. The method of claim 1 wherein the value and the change in the value with respect to time is determined from at least one of frequency, quality factor and amplitude of a resonance.

* * * * *